(12) United States Patent
Sarkar

(10) Patent No.: US 6,316,544 B1
(45) Date of Patent: Nov. 13, 2001

(54) AQUEOUS PAINT COMPOSITION

(75) Inventor: Manish Sarkar, Widmer End (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/551,558

(22) Filed: Apr. 18, 2000

(30) Foreign Application Priority Data

Apr. 20, 1999 (GB) .................................................. 9908899

(51) Int. Cl.⁷ ...................................................... C08L 33/02
(52) U.S. Cl. .......................... 524/832; 524/431; 524/535; 524/523; 524/812; 524/522
(58) Field of Search ..................................... 524/522, 535, 524/431, 832, 812

(56) References Cited

U.S. PATENT DOCUMENTS 4,376,175 * 3/1983 Posten .
4,432,797 * 2/1984 Vasishth et al. .
5,576,384    11/1996 Nölken et al. .

FOREIGN PATENT DOCUMENTS 0327 376    8/1989   (EP) .
1 516 802    7/1978   (GB) .
96/18698    6/1996   (WO) .

* cited by examiner

*Primary Examiner*—Tae H. Yoon
(74) *Attorney, Agent, or Firm*—Pillsbury Winthrop LLP

(57) ABSTRACT

An aqueous paint composition comprising a polymeric binder and a particulate non-film-forming solid in which;

(i) at least 20% by weight of the polymeric binder is a thickener which is an, amine or acid functional, acrylic addition polymer which is at least partially neutralised, the thickener being such that a 1% by weight solution of the thickener in water when fully neutralised has a viscosity of at least 10 centipoise (measured using a Brookfield Spindle number 3 at 60 rpm and 25° C.), (ii) the pvc of the coating composition is 65 to 95%;

(iii) the volume solids of the composition is 8 to 30%.

13 Claims, No Drawings

AQUEOUS PAINT COMPOSITION

This invention relates to an aqueous paint composition, particularly one useful for painting the interior and exterior walls and the ceilings of buildings, a process for preparing the composition and a process for using it.

Paints for the walls and ceilings of buildings generally comprise a polymeric binder and particulate non-film-forming solid. These paints are generally one of two types. The first type are solventborne paints in which a polymeric binder is dissolved or dispersed in an organic solvent. The second type are waterborne paints in which the polymeric binder is a dispersion of insoluble polymer in water. Waterborne paints of this second type are often referred to as 'emulsion paints' and these represent the most common type of wall and ceiling paints now in use. Emulsion paints were developed in the 1950's and have continued largely unchanged to this day.

Emulsion paints comprise a film-forming polymer which is insoluble in water and which is in the form of a colloidal dispersion (sometimes called an "emulsion" or a "latex"). They also comprise one or more particulate non-film forming solids which can be pigments, such as titanium dioxide, or extenders such as powdered chalk. The paints usually also comprise a thickener.

The dispersed insoluble film-forming polymer is usually a vinyl or acrylic addition polymer, although alkyd, epoxy, polyurethane, or polyester polymers are also known. The dispersed insoluble polymer is inherently film-forming so that as the paint film dries, the polymer coalesces to form a continuous film. The coalesced film of insoluble polymer gives the final dried coating cohesion by binding together the pigment and extender and also provides the dried coating with adhesion to the underlying substrate. Both cohesion and adhesion are important in forming paints with good abrasion resistance and water resistance. These two qualities are particularly important in making practical robust paints that can withstand cleaning, for example by rubbing with a wet cloth to remove marks. an operation that is particularly common on walls in homes where there are children. This property is generally referred to as scrub resistance.

In view of their value in providing paints with good end properties such as scrub resistance, acrylic or vinyl polymer dispersions have been considered a central component of waterborne 'emulsion' paints for walls and ceilings for decades.

Pigments are particulate non-film-forming solids, which give the final paint film opacity, that is, the ability to hide the underlying substrate. Finely divided titanium dioxide is particularly good at this, and is widely used as a white pigment. The pigments also give the paint film its colour. Many coloured pigments can be used, usually in combination with titanium dioxide, to achieve the desired final paint colour.

Extenders are particulate non-film-forming solids which are often added to paints to lower the cost, to modify the rheology, or to improve pigment utilisation by inhibiting pigment particle agglomeration. They differ from true pigments in having little or no opacifying effect.

Thickeners are generally polymeric materials that, as their name suggests, increase the viscosity of the paint. Emulsion paints, being made from aqueous polymer dispersions, would have a viscosity very similar to that of water if it were not for the addition of thickeners. Such a low viscosity would cause application problems with the paint running down walls and dripping off rollers. Hence, thickeners are added. Thickeners vary widely in their chemical form, but can generally be described as water-soluble or water swellable polymers having hydrophilic groups. The most commonly used thickeners for emulsion paints are based on modified cellulose. Generally, thickeners are added to emulsion paints in amounts of up to 10% by weight of the total binder, most often around 3 to 6%.

With emulsion paints, certain of the important properties of the final paint film depend to a large extent on the amount of particulate non-film-forming solid (i.e. pigment and extender) present. The amount of such particulate solid is usually expressed as the volume of such material as a percentage of the theoretical total volume of dried paint. The theoretical volume is calculated on the basis of the non-volatile components of the paint composition and excludes any air which may in fact become trapped in the dried film and increase its actual volume. This percentage is usually called the "pigment volume content" or "pvc". When the term "pvc" is used in connection with a liquid paint it means that the liquid paint is such that a coating of the paint when fully dry will have that pvc. Unless otherwise specified, "pvc" is used to mean the total amount of particulate non-film-forming solid, both pigment and extender.

In particular, the opacity of an emulsion paint can be improved by using a relatively high pvc. A pvc above 65% and preferably above 70% or 75% would be desirable to give a high opacity. This is probably because, when the pvc is high, air voids are created in the dried coating which introduce light-scattering and increase its opacity. However, the problem with using a high pvc in a conventional emulsion paint is that the cohesion and adhesion suffer and so scrub resistance tends to be poor. This is probably because the air voids that serve to improve the opacity also introduce weaknesses in the final film.

One way to improve opacity at lower pvc would be to use a higher proportion of opacifying pigment, such as titanium dioxide, relative to the amount of extender. However, the pacifying pigments are much more expensive than extenders and this solution is uneconomic.

The problem which this invention addresses is how to achieve paint compositions which can be used in the same way as conventional emulsion paints but which have a high pvc and so a high opacity while as the same time maintaining, or improving upon, the scrub resistance expected of an emulsion paint.

Certain paint compositions have been suggested to replace conventional emulsion paints, which contain a silanol functionalised resin in solution instead of a dispersed polymer and have a high pvc. The crosslinking of the silanol groups when the water evaporates gives these compositions good scrub resistance. The disadvantages of using silanol groups are that they require expensive silane functional raw materials and also that the compositions can be unstable when stored in very warm conditions for long periods due to premature crosslinking of the silanol groups. An alternative is clearly called for.

We have now discovered that surprisingly one can successfully formulate waterborne paints for walls and ceilings at high pvc with the use of certain film-forming polymers which also act as thickeners for the paint. These thickeners can be used as the sole, or major proportion of the paint binder or even as a relatively minor component in conjunction with other conventional film forming polymer. We have found that at least 20% by weight of the paint binder must be made up of these thickeners if the benefits of good scrub resistance at high pvc are to be achieved.

According to the present invention there is provided an aqueous paint composition comprising a polymeric binder and a particulate non-film-forming solid in which;

i) at least 20% by weight of the polymeric binder is a thickener which is an, amine or acid functional, acrylic addition polymer which is at least partially neutralised, the thickener being such that a 1% by weight solution of the thickener in water when fully neutralised has a viscosity of at least 10 centipoise (measured using a Brookfield Spindle number 3 at 60 rpm and at 25° C.), ii) the pvc of the composition is 65 to 95%, iii) the non-volatile volume solids of the composition is 8 to 30%.

Surprisingly, these compositions have a much better scrub resistance than conventional emulsion paint in this relatively high pvc range in which the compositions have good opacity. This means that they can be applied at lower dry film weight while still giving opacity comparable to conventional emulsion paints and have improved scrub resistance over such paints. This means that the compositions make more efficient use of the non-volatile components, particularly titanium dioxide, which is an expensive component, and consequently allow significant cost reductions. This combination of lower cost and higher performance is the wholly unexpected result of using the defined thickener as at least 20% of the main film forming binder rather than virtually all dispersed insoluble polymer as in the conventional compositions.

Conventional emulsion paints normally comprise 25 to 40% by volume of non-volatile solids and if the non-volatile solids content of a conventional emulsion paint drops below about 25% by volume, the performance of the paint generally becomes unacceptable. Because of their good opacity, and the presence of high levels of thickener, the paints of the present invention can contain a much lower proportion of non-volatile solids than conventional emulsion paints, while retaining a conventional viscosity. At lower solids, a conventional thickness of wet paint according to the invention can be applied which results in a lower dry film weight, while still having the required opacity. This enables the paints to be applied by conventional methods, and the user need notice little difference in application characteristics. Preferably, the paint composition has a non-volatile volume solids content of 10 to 20%, most preferably 10 to 15%. These relatively low levels of non-volatile solids means that these paints can be made less dense and so less heavy and easier to carry and transport.

These compositions are water based and so the main, or only, volatile liquid component is water. Conventional emulsion paints usually also comprise, as well as water, a minor amount of volatile organic solvent, for example, to aid coalescence of the dispersed polymer. The compositions of the present invention do not necessarily require such a solvent and it is desirable from an environmental viewpoint to use little or none. Small amounts of volatile organic solvent can be present if desired. Examples of such organic solvents are Dowanol PM™ (dipropylene glycol monomethyl ether from Dow chemicals), Butyl Cellosolve™, Texanol™ or white spirit. Preferably the paints of the present invention comprise no more than 3% by weight, based on the total weight of the composition, of volatile organic solvents, most preferably none.

Acrylic addition polymers are polymers of ethylenically unsaturated acrylic monomers, such as acrylic or methacrylic acid and their esters. Examples of esters of acrylic or methacrylic acid are their $C_{1-8}$ alkyl esters such as methyl methacrylate, ethyl acrylate, butyl acrylate, butl methacrylate, and 2-ethyl hexyl acrylate. Other acrylic monomers include hydroxyl functional monomers such as hydroxyethyl acrylate, hydroxyethyl methacrylate and hydroxybutyl acrylate and amine functional monomers such as dimethylaminoethyl methacrylate. The thickener can also contain vinyl monomers such as styrene.

Preferred acrylic addition polymers also comprise $C_{8-30}$ hydrophobic alkyl chains. Such hydrophobic chains can be introduced by including a monomer having alkyl chains such as decyl acrylate, dodecyl acrylate, laurvl methacrylate, stearyl methacrylate or steryl itaconate. Such alkyl chains can also be indirectly attached to the polymer chain, for example via a poly (ethylene glycol) chain.

The thickener preferably has a weight average molecular weight as measured by gel permeation chromatography of 4,000 to 200,000, more preferably 40,000 to 100,000. It preferably has a theoretical glass transition temperature as calculated by the Fox equation of –30 to 140° C.

Acid groups on the thickener are preferably carboxylic acid groups —COOH. Preferred acid functional polymers have an acid value of greater than 100 mgKOH/g, preferably greater than 200 mgKOH/g.

Amine groups on the thickener can be primary, secondary or tertiary amine groups of formula II;

$$—N—H_aR_{2-a} \qquad \text{Formula II}$$

in which a is 0 to 2, preferably 1 or 2, and R is $C_{1-4}$ alkyl, preferably methyl or ethyl.

Preferred amine functional thickeners have an amine value of greater than 70 mgKOH/g, more preferably greater than 100 mgKOH/g.

The amine or acid groups need to be at least partially neutralised in order to solublise the thickener. Acids such as acetic acid or lactic acid can be added to neutralise amine groups. Bases such as ammonia or amines such as ethylamine, or alkali metal hydroxides, such as sodium hydroxide can be added to neutralise carboxyl groups. Preferably, sufficient acid or base is added to neutralise at least 80% of the acid or amine groups and more preferably all of them. More than enough acid or base can be added but this risks impairing the water resistance of the final paint film.

The thickener can also additionally have non-ionic groups. Preferred non-ionic groups are poly (ethylene oxide) moieties of the general formula I;

$$RO—(—CH_2—CH_2—O—)_n— \qquad \text{Formula I}$$

in which R is H or $C_{1-30}$ alkyl, preferably $C_{10}$ to $_{18}$, and n is, on average, 5 to 15, preferably 7 to 10. These polyethylene oxide moieties can also contain a minor proportion of units derived from higher alkylene oxides, such as propylene oxide. Such additional alkylene oxides should not be present in an amount such that the non-ionic group is no longer hydrophilic, which in practice means at less than 10% by weight based on the weight of non-ionic group. Most preferred non-ionic groups are of Formula I and contain no units derived from higher alkylene oxides.

Preferably, the thickener is substantially free of silanol groups and hydrolysable silane Groups. Silanol groups are groups of formula —$Si(OH)_3$. Hydrolysable silane groups are groups are groups of formula —$Si(OR^1)_n(R^2)_{3-n}$, where n is 1 to 3, $OR^1$ is a hydrolysable oxy group, $R^1$ is any group that can be removed from the oxy group by hydrolysis to leave a silanol moiety —Si—OH, $R^2$ is any other benign group which does not prevent hydrolysis.

The thickener acts both to thicken the paint and as a binder. This has the benefit of providing the both necessary application viscosity and the required paint film properties and surprisingly allows the dispersed polymer of conventional emulsion paints to be used in much reduced amounts or even to be dispensed with altogether.

The thickener must have a viscosity in water such that a 1% by weight solution of the thickener in water, when fully neutralised must have a viscosity of more than 10 cps, preferably at least 150 centipoise, more preferably at least 200 centipoise as measured using a Brookfield Spindle number 3 at 60 rpm and at 25° C. The actual viscosity of the paint composition depends on the concentration of the thickener and the proportion of acid or amine groups that are neutralised. Typically, the paint composition should have a viscosity of 0.3 to 1.9 poise as measured by ICI Cone & Plate Viscometer and 3 to 15 poise as measured by a Rotothinner™.

These thickeners can be made by conventional methods in which the constituent monomers are polymerised by contacting them with a polymerisation initiator at a temperature at which polymerisation occurs. Suitable methods include emulsion polymerisation, dispersion polymerisation or solution polymerisation. U.S. Pat. No. 5,130,369 and U.S. Pat. No. 5,294,692 exemplify these methods.

Certain selected commercial thickeners can also be used. For example, some suitable acid functional acrylic polymer thickeners are sold under the Alcogum or Acrysol trade marks.

The non-film-forming particulate solids generally have a number average particle size from 50 nm to 50 $\mu$m depending on the type of solid. These particulate solids include opacifying pigments and extenders.

Solid inorganic white opacifying pigments include rutile and anatase titanium dioxides. Finely divided particulate titanium dioxide is a staple commercial product widely used in paints. Any grade useful for making paints can be used in the compositions. Generally, the titanium dioxide has a particle size of 150 to 500 nm. Commercial titanium dioxide is often coated with silica, alumina, or zirconia. Typical organic non-film-forming white opacifying pigments are voided particles known as Ropaque™, particle size about 400 nm as described in European Patent EP 0 113 435B and Spindrift™ particle size 1 to 15 $\mu$m as described in European Patent EP 0 041 508B.

Many extenders are also staple commercial products. They are finely divided inorganic materials that are insoluble in water. They have little or no opacifying effect and so are not considered to be pigments. Examples of extenders are oxy compounds of calcium, magnesium, aluminium, and silicon such as chalk, limestone, barytes, clays (for example kaolin or bentonite) and talc. Certain extenders are used to reduce the reflectivity of the dry paint film and these are called matting agents. The most common matting agent is finely divided silica.

Preferably, the paints of the present invention contain 5 to 25% by volume of opacifying pigment based on the total volume of particulate non-film-forming solid, more preferably 8 to 20%.

Preferably, the total pvc of the paint composition is 75 to 90%.

Preferably, at least 30% by weight of the polymeric binder is the thickener, more preferably at least 50%.

As well as the thickener, the film forming binder can also comprise a dispersed film-forming polymer such as a conventional paint latex. The compositions preferably contain no such dispersed polymer but a proportion, such as up to 50%, 70% or even up to 80% by weight based on the total amount of film-forming polymer can be added if desired. Such conventional latexes, which commonly comprise an acrylic or vinyl polymer, are described in Surface Coating Science & Technology by Swaraj Paul, John Wiley & Sons page 579. The presence of up to 80% by weight of latex as a proportion of the binder still gives improved scrub resistance at high pvc relative to comparable compositions in which the binder is substantially all latex.

The composition can also contain small amounts, for example 0.1 to 7% by volume based on the dried coating, of a silanol-functional polymer although these are not preferred as they add substantially to the cost. Preferably, the composition comprises less than 5% by volume based on the dried coating, more preferably less than 1% and most preferably none.

The compositions can also contain other conventional paint components. For example, coloured pigments can be added to achieve the required final paint colour. Adhesion promoters, biocides, surfactants, defoamers, and other common paint additives can also be added, as the application requires.

The present invention also provides a concentrate that can be diluted with water to form the paints of the present invention described above. The concentrate is essentially the same as the paint composition except that it contains less water. Hence, the pvc and the amounts of water-soluble polymer, based on the dry paint film are the same. Preferably, the concentrate has a solids content of 20% to 50% by volume. The present invention thus allows the production of a paint concentrate of about half the final paint volume to be sold to the consumer who can then dilute it to normal application solids. This can save on packaging, transport, and storage costs. Conventional emulsion paints cannot be formulated in this way because their final solids must be around 25 to 40% which means that any attempt to formulate a concentrate of half the volume by leaving out water would result in a solid unusable product.

One useful means of overcoming an undesirably high viscosity in the concentrate is to neutralise the thickener only partly, or not at all in the concentrate, and to add acid or base so as to neutralise the thickener only in the final composition. The thickener generally has a low viscosity when not neutralised, and so this method can give low viscosity concentrates while also allowing final compositions having a viscosity in the desired range.

The compositions can be made by mixing the components. One preferred method is to disperse the pigments and extenders in water so as to form a millbase to which is then added an aqueous solution of the neutralised thickener. Alternatively, some or all of the pigments and extenders can be dispersed in the aqueous solution of the neutralised thickener.

The paints of the present invention are used in a coating process that comprises applying a layer of the paint composition as defined above to a substrate, and causing or allowing the layer to dry.

The paints can be applied by conventional means such as brushing, spraying, or roller coating. The paints are most useful for painting the interior and exterior walls of buildings and their interior ceilings. The paints are generally left to dry at ambient temperature (around 5 to 30° C.) although heating can be applied if desired. Typical substrates are the walls and ceilings of buildings, which can be any conventional material such as stone, brick, breezeblock, plaster, plasterboard, or wood.

The invention will now be illustrated by way of the following examples.

EXAMPLES

1. Testing

Paints in these Examples were subjected to the following tests;

1.1 The ICI Scrub Test

This tests the wet abrasion resistance of a paint coating. The paint to be tested was first passed through an 80 µm nylon mesh to remove bits and was centrifuged at 1500 rpm for 7 minutes under vacuum to remove air. A 200 µm thick wet coating of paint was applied using a block spreader to a black surface on a polyvinyl chloride sheet 165 mm long and 432 mm wide and available as Scrub Test Panel P121-ION™ from the Leneta Company of N.J., USA. Each painted panel was allowed to dry for either 1, 7 or 28 days (as specified in the results) at room temperature (about 18° C.). The panel was cut into eight equal rectangles 160 mm long and 54 mm wide and the abrasion resistance of each rectangle was determined as follows;

A felt pad was mounted on a stem which in turn was mounted 5 to 10 mm off-centre in a rotary drive, so that operation of the drive caused the pad to sweep out eccentrically a circular area of 1250 mm$^2$. The pad was moistened with a 0.5% by weight solution in water of the non-ionic surfactant Synperonic N™ supplied by Imperial Chemical Industries Plc of Wilton, Cleveland, UK and kept moist throughout the test by adding more of the surfactant solution. Each painted rectangle was in turn laid on a platen with its painted surface uppermost. The platen was carried on one arm of a lever mounted on a horizontal pivot. The other arm of the lever carried a 0.5 kg weight. The distances of the centre of the platen and the weight from the pivot were 150 mm and 180 mm respectively. The weight, acting via the lever, rotated the platen into the horizontal plain and pressed it against the pad at a constant pressure. The pad was then eccentrically rotated against the painted surface until all of the paint was removed from the area under the rotation of the pad. The number of rotations required to do this was recorded as the result. The test was carried out on all eight rectangles and then a further eight for the same paint. The average of these sixteen counts was reported as the ICI Scrub Resistance of the paint.

1.2 ICI Opacity Test

Although the ICI Opacity Test is carried out on a dry paint film, the results are expressed in such a way as to allow comparison of the effective covering power of the paints. Thus, the value obtained is related to the area of substrate (for example wall or ceiling) which one could expect to cover per litre of paint at satisfactory hiding. It has units of m$^2$/litre. It is not an absolute value but allows different paints to be compared. It is measured as follows;

The paint was applied to a 280 mm by 10 nm, 50µm thick filly transparent Melinex™ (from ICI) polyethylene terephthalate foil using a 150 µm block spreader. The applied coating was allowed to dry at room temperature (about 18° C.) for 7 days. The coated foil was then inspected over a light box and three defect-free zones identified. Each defect-tree zone was placed in turn on a white ceramic tile with its paint coating uppermost. The CIE tristimulas value Y for each coating was measured using a spectrophotometer fitted with a CIE Standard Illuminant C and 2 degree observer conditions. Each zone is then placed on a black ceramic tile and the CIE "Y" values again determined as above. After measurement of the Y values, the thickness of the paint coating in each defect-free zone is determined and an average of the thicknesses is taken. Thickness is determined by stamping out a 36 mm$^2$ rectangle from each zone, weighing the rectangle, completely removing the coating using acetone, re-weighing the rectangle and then, using the weight of the coating, the area of the rectangle and the density of the solids content of the paint to calculate the volume "V" of paint which would be spread onto 1 square metre if the paint were applied at the same rate. A notional film thickness "T" is also calculated. The Y values and the notional film thickness T are substituted into the Kubelka-Munk Equation to arrive at a value for the Scattering Coefficient "S" in accordance with British Standard BS 3900 Part D7 1983 (also known as 150 6504/1-1983) paragraph 4. The value for "S" multiplied by the volume % solids and 1000 is recorded as the ICI Opacity.

2. General Methods of Making the Paint Compositions

The following general methods were used to make various paints. The details of the paint formulations and the methods used for each one are given in Tables 1A, 2A, 3A, 4A, and 5A and the properties and test results for each of the corresponding paints is given in Tables 1B, 2B, 3B, 4B, and 5B. In each of the tables, the method used to make each composition is given in brackets Following the example number.

2.1 Method A

The china clay, talc, and TiO2 were dispersed in water in a high-speed disperser with the Dispex. The guar gum was added slowly at high speed and water added if necessary to keep the contents mobile. This was the millbase. The thickener/binder was added to 10% of the total water with the defoamer. The millbase was added to the thickener solution with stirring (Paddle type). The rest of the water and the biocide were added and then ammonia solution was added to adjust pH to 8–9.

2.2 Method B

The TiO2 was dispersed in the thickener—binder with 30% of the water, using a high-speed disperser. The pH was adjusted to 5–6 with acetic acid. The guar gum was added and dispersed. The talc and 10% of the water was added and dispersed. The clay was added very slowly with water as required to keep paint mobile. The rest of the water was added along with the remaining acetic acid.

2.3 Method C

The china clay, talc and TiO2 were dispersed in water in a high-speed disperser with the Dispex and defoamer. For example 16, the guar gum was added slowly at high speed and water added if necessary to keep the contents mobile. This was the millbase. The millbase was added to the DS 910 latex with stirring using a paddle stirrer. The rest of the water and the biocide were then added.

2.4 Method D

The latex paint (by method C) was added to the thickener-based paint (method A) in various proportions (1:2, 1:1, 2:1).

3. Paint Composition

The abbreviations used in the examples are as follows;

Brookfield viscosity is in centipoise measured using spindle number 3 at 60 rpm at 25° C.

Acid and amine values are in mgKOH/g.

a) Pigments and Fillers

China Clay is a filler supplied as China Clay Supreme™ from English China Clays.

Talc is a filler supplied as Luzenac OOC™ from Luzenac.

TiO2 is titanium dioxide pigment supplied as RTC 90™ from Tioxide.

b) Thickeners as Defined in the Claims.

SL 511 is Alcogum SL 511™ an aqueous dispersion of an amine functional acrylic polymer thickener having a measured amine value of approximately 135 and a 1% by weight solution in water which has a Brookfield viscosity of 280 when fully neutralised, available from Alco Chemicals.

SL 520 is Alcogum 520™ an aqueous dispersion of an amine functional acrylic polymer thickener having a measured amine value of approximately 130 and a 1% by weight solution in water which has a Brookfield viscosity of 890 when fully neutralised, available from Alco Chemicals.

SL 70 is Alcogum SL 70™ an aqueous dispersion of an acid functional acrylic polymer thickener having a measured acid value of approximately 325 and a 0.5% by weight solution in water which has a Brookfield viscosity of 1170 when fully neutralised, available from Alco Chemicals.

SL 76 is Alcogum SL 76™ an aqueous dispersion of an acid functional acrylic polymer thickener having a measured acid value of approximately 338 and a 1% by weight solution in water which has a Brookfield viscosity of 1290 when fully neutralised, available from Alco Chemicals.

DR1 is Acrysol DR1™ an aqueous dispersion of an acid functional acrylic polymer thickener having a measured acid value of approximately 255 and a 1% by weight solution in water of which has a Brookfield viscosity of 56 when fully neutralised, available from Rohm and Haas.

PP 102 is Polyphobe 102™ an aqueous dispersion of an acid functional acrylic polymer thickener having a measured acid value of approximately 239 and a 1% by weight solution in water which has a Brookfield viscosity of 10 when filly neutralised, available from Union Carbide.

c) Conventional Thickeners

Guar is guar gum thickener from Haji Dossa of Pakistan.

Blanose is Blanose 7L2C™, a carboxymethyl cellulose from Hercules Ltd.

d) Conventional Latex

DS 910 is Rhodopas DS910™ a conventional vinyl based polymer latex from Rhodia.

e) Miscellaneous Additives

Defoam is a defoaming agent Dispelair™ from Blackburn Chemicals.

Biocide is V189™ from KMZ Chemicals.

Dispex is Dispex N40™, a dispersing aid from Allied Colloids NH$_3$ is saturated aqueous ammonia.

Acetic acid is glacial acetic acid.

f) Other Abbreviations

VNV is percentage non-volatile content by volume of the composition.

pvc is the percentage volume content of inorganic components (pigments and fillers) of the non-volatile composition.

TABLE 1A

Compositions according to the invention, using thickeners Alcogum SL 511, SL70 and SL 76 as the binders.

| Example | water | De-foamer | Biocide | Dispex | China Clay | Talc | TiO2 | Guar | SL 511 | Acetic acid |
|---|---|---|---|---|---|---|---|---|---|---|
| 1 (B) | 63.75 | 0.07 | 0.07 | 0.07 | 10.42 | 11.08 | 7.70 | 0.00 | 6.54 | 0.32 |
| 2 (B) | 60.96 | 0.06 | 0.06 | 0.06 | 9.96 | 10.60 | 7.36 | 0.00 | 10.43 | 0.50 |
| 3 (B) | 58.03 | 0.06 | 0.06 | 0.06 | 9.48 | 10.09 | 7.01 | 0.00 | 14.52 | 0.70 |
| 4 (B) | 55.00 | 0.05 | 0.05 | 0.05 | 8.03 | 8.55 | 5.94 | 0.00 | 21.30 | 1.03 |

| Example | water | Defoamer | Biocide | Dispex | China Clay | Talc | TiO2 | Guar | SL76 | SL70 | NH$_3$ |
|---|---|---|---|---|---|---|---|---|---|---|---|
| 5 (A) | 66.59 | 0.12 | 0.04 | 0.09 | 12.83 | 8.30 | 10.43 | 0.17 | | 0.80 | 0.63 |
| 6 (A) | 66.19 | 0.12 | 0.04 | 0.09 | 12.50 | 8.09 | 10.17 | 0.16 | 2.02 | | 0.62 |
| 7 (A) | 65.75 | 0.10 | 0.03 | 0.07 | 13.59 | 6.61 | 8.31 | 0.21 | 4.83 | | 0.50 |

TABLE 1B

Properties and test results for Examples 1 to 7 from Table 1A.

| Example | Thickener | vnv | pvc | TiO2 % | ICI Opacity | ICI scrubs |
|---|---|---|---|---|---|---|
| 1 | Alcogum SL511 | 14 | 88 | 7.72 | 8900 | 12 |
| 2 | Alcogum SL511 | 14.25 | 82 | 7.4 | 8000 | 170 |
| 3 | Alcogum SL511 | 14.53 | 76 | 7.05 | 7300 | 1000 |
| 4 | Alcogum SL511 | 14 | 65 | 6.0 | 5400 | 2130 |
| 5 | Alcogum SL76 | 14 | 95 | 10.43 | 11000 | 20 |
| 6 | Alcogum SL76 | 14 | 92 | 10.17 | 10650 | 60 |
| 7 | Alcogum SL76 | 14 | 85 | 8.3 | 10200 | 320 |

TABLE 2A

Comparative Examples of Paints based on conventional vinyl Latex binder, DS 910 ™

| Example | Water | Biocide | Dispex | Defoamer | China Clay | Talc | TiO2 | Blanose | DS910 |
|---|---|---|---|---|---|---|---|---|---|
| 8 (C) | 65.52 | 0.07 | 0.07 | 0.07 | 10.44 | 11.11 | 7.72 | 0.47 | 4.54 |
| 9 (C) | 62.71 | 0.06 | 0.06 | 0.06 | 9.99 | 10.63 | 7.39 | 0.45 | 8.65 |
| 10 (C) | 59.73 | 0.06 | 0.06 | 0.06 | 9.52 | 10.13 | 7.03 | 0.42 | 12.98 |

TABLE 2B

Properties and test results for comparative compositions 8 to 10 from Table 2A

| Example | vnv | Pvc | TiO2 % | ICI opacity | ICI scrubs |
|---|---|---|---|---|---|
| 8 | 14 | 88 | 7.72 | 7420 | 12 |
| 9 | 14.25 | 82 | 7.4 | 6750 | 30 |
| 10 | 14.5 | 76 | 7.05 | 5520 | 75 |

TABLE 3A

Examples of compositions having various values of non-volatile volume content (VNV).

| Example | Water | Defoamer | Biocide | Dispex | China Clay | Talc | TiO2 | Guar | SL76 | PP102 | $NH_3$ |
|---|---|---|---|---|---|---|---|---|---|---|---|
| 11 (A) | 52.38 | 0.15 | 0.05 | 0.11 | 15.75 | 10.12 | 12.81 | 0.10 | | 7.95 | 0.58 |
| 12 (A) | 68.67 | 0.10 | 0.03 | 0.07 | 10.62 | 6.84 | 8.64 | 0.07 | 4.47 | | 0.51 |
| 13 (A) | 73.69 | 0.09 | 0.03 | 0.06 | 8.92 | 5.74 | 7.26 | 0.06 | 3.75 | | 0.42 |
| 14 (A) | 80.02 | 0.07 | 0.02 | 0.05 | 6.78 | 4.36 | 5.52 | 0.04 | 2.85 | | 0.30 |

TABLE 3B

Properties and test results for the compositions 11 to 14 of Table 3A.

| Example | Thickener | VNV | ICI Opacity | ICI Scrubs |
|---|---|---|---|---|
| 11 | PP102 | 20 | 15,000 | 55 |
| 12 | SL 76 | 12.3 | 10,200 | 185 |
| 13 | SL 76 | 10 | 6,500 | 233 |
| 14 | SL 76 | 7.3 | 6,000 | 55 |

TABLE 4A

Paints containing both conventional vinyl latex DS 910 and thickener Alcogum SL 76 in various ratios.
Examples 15 to 19 all contained 0.11 parts by weight of defoamer, 0.03 parts by weight of biocide and 0.08 parts by weight of Dispex.

| Example | water | China Clay | Talc | TiO2 | Guar | SL76 | DS910 | $NH_3$ |
|---|---|---|---|---|---|---|---|---|
| 15(C) | 66.37 | 11.49 | 7.43 | 9.35 | 0.15 | | 2.99 | |
| 16(D) | 66.20 | 11.68 | 7.56 | 9.50 | 0.15 | 3.28 | 1.01 | 0.38 |
| 17(D) | 66.58 | 11.69 | 7.57 | 9.51 | 0.15 | 2.46 | 1.52 | 0.29 |
| 18(D) | 66.96 | 11.70 | 7.57 | 9.52 | 0.15 | 1.64 | 2.03 | 0.19 |
| 19(A) | 65.25 | 11.73 | 7.59 | 9.54 | 0.15 | 4.93 | | 0.58 |

TABLE 4B

Properties and results for the paint compositions 15 to 19 of Table 4A.

| Example | Ratio of latex paint to Thickener based paint | % latex of total binder volume | % Guar Gum of total binder volume | % Thickener of total binder volume | ICI Scrubs | ICI Opacity |
|---|---|---|---|---|---|---|
| 15 | 0:1 | 0 | 9 | 91 | 500 | 9,940 |
| 16 | 1:2 | 31 | 8 | 61 | 350 | 9,248 |
| 17 | 1:1 | 46 | 8 | 46 | 264 | 8,895 |
| 18 | 2:1 | 61 | 9 | 30 | 128 | 8,520 |
| 19 | 1:0 | 91 | 9 | 0 | 59* | 7,791 |

TABLE 5A

Paints according to the invention made using various thickeners having various viscosities as a 1% by weight solution in water.

| Example | Water | Defoamer | Biocide | Dispex | China Clay | Talc | TiO2 | Guar | SL 511 | SL 520 | Acetic acid |
|---|---|---|---|---|---|---|---|---|---|---|---|
| 20(B) | 62.5 | 0.10 | 0.03 | 0.07 | 13.3 | 6.5 | 8.1 | 0.2 | | 8.84 | 0.43 |
| 21(B) | 58.0 | 0.06 | 0.06 | 0.06 | 9.5 | 10.1 | 7.0 | 0 | 14.5 | | 0.70 |
| 22(B) | 61.0 | 0.06 | 0.06 | 0.06 | 10.0 | 10.6 | 7.4 | 0 | 10.4 | | 0.50 |

| Example | Water | Defoamer | Biocide | Dispex | China Clay | Talc | TiO2 | Guar | SL 76 | DR1 | PP 102 | NH$_3$ |
|---|---|---|---|---|---|---|---|---|---|---|---|---|
| 23(A) | 65.7 | 0.10 | 0.03 | 0.07 | 13.6 | 6.6 | 8.3 | 0.21 | 4.83 | | | 0.50 |
| 24(A) | 72.1 | 0.12 | 0.04 | 0.09 | 8.8 | 5.7 | 7.2 | 0.16 | | 5.24 | | 0.61 |
| 25(A) | 63.4 | 0.10 | 0.03 | 0.07 | 13.2 | 6.4 | 8.1 | 0.20 | | | 7.99 | 0.50 |

TABLE 5B

Properties and results of testing the paint example 20 to 25 of Table 5A.

| Example | Thickener | Thickener Brookfield viscosity* | Vnv | Pvc | ICI opacity | ICI scrubs |
|---|---|---|---|---|---|---|
| 20 | Alcogum SL 520 | 890 | 14.0 | 82.6 | 9,574 | 185 |
| 21 | Alcogum SL511 | 280 | 14.5 | 76 | 7,300 | 1000 |
| 22 | Alcogum SL511 | 280 | 14.25 | 82 | 8,000 | 170 |
| 23 | Alcogum SL 76 | 1170 | 14 | 85 | 10,200 | 320 |
| 24 | Acrysol DR1 | 56 | 10.6 | 80 | 5,577 | 770 |
| 25 | Polyphobe 102 | 10 | 14.0 | 82.6 | 8,970 | 84 |

*Viscosities were measured on a 1% by weight solution in water except for Alcogum SL 76 which was too high in viscosity, and so a 0.5% by weight solution was used instead. Viscosities were measured on the thickeners after total neutralisation.

What is claimed is:

1. An aqueous paint composition comprising a polymeric binder and a particulate non-film-forming solid in which;
   (i) at least 20% by weight of the polymeric binder is a thickener which is an, amine or acid functional, acrylic addition polymer which is at least partially neutralised, the thickener being such that a 1% by weight solution of the thickener in water when fully neutralised has a viscosity of at least 10 centipoise (measured using a Brookfield Spindle number 3 at 60 rpm and 25° C.),
   (ii) the pvc of the coating composition is 65 to 95%;
   (iii) the volume solids of the composition is 8 to 30%.

2. A composition as claimed in claim 1 in which the volume solids is 10 to 20%.

3. A composition as claimed in claim 2 in which the volume solids is 10 to 15%.

4. A composition as claimed in claim 1 in which the thickener has a weight average molecular weight of 4,000 to 200,000.

5. A composition as claimed in claim 1 in which the thickener has carboxylic acid groups.

6. A composition as claimed in claim 5 in which the thickener has an acid value of greater than 100 mgKOH/g.

7. A composition as claimed in claim 1 in which the thickener has amine groups.

8. A composition as claimed in claim 7 in which the thickener has an amine value of greater than 70 mgKOH/g.

9. A composition as claimed in claim 1 in which sufficient acid or base is present to neutralise at least 80% of the acid or amine groups on the thickener.

10. A composition as claimed in claim 1 in which the thickener has a viscosity as of 1% by weight solution in water of at least 150 centipoise.

11. A composition as claimed in claim 1 which has a pvc of 75 to 90%.

12. A paint concentrate which comprises a composition as claimed in claim 1 with a solids content of 20 to 50% by volume.

13. A coating process which comprises applying a layer of a composition as defined in claim 1 to a substrate, and causing or allowing the layer to dry.

* * * * *